(12) United States Patent  (10) Patent No.: US 9,179,036 B2
Horiuchi  (45) Date of Patent: Nov. 3, 2015

(54) IMAGE PROCESSING APPARATUS CORRESPONDING TO A PLURALITY OF DOCUMENTS ON A DOCUMENT PLATE, METHOD FOR CONTROLLING THE SAME, AND PROGRAM

(75) Inventor: Akinori Horiuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 252 days.

(21) Appl. No.: 13/325,929

(22) Filed: Dec. 14, 2011

(65) Prior Publication Data

US 2012/0154875 A1  Jun. 21, 2012

(30) Foreign Application Priority Data

Dec. 21, 2010 (JP) ................................. 2010-285153

(51) Int. Cl.
H04N 1/00 (2006.01)
H04N 1/387 (2006.01)

(52) U.S. Cl.
CPC ......... *H04N 1/3878* (2013.01); *H04N 1/00408* (2013.01); *H04N 2201/0091* (2013.01)

(58) Field of Classification Search
None
See application file for complete search history.

(56) References Cited

U.S. PATENT DOCUMENTS

| 5,608,541 | A | * | 3/1997 | Yamada | 358/448 |
| 6,111,667 | A | * | 8/2000 | Mishima et al. | 358/488 |
| 8,400,693 | B2 | * | 3/2013 | Uwatoko | 358/504 |
| 8,406,570 | B2 | * | 3/2013 | Morimoto et al. | 382/296 |
| 2004/0101209 | A1 | * | 5/2004 | Tanaka | 382/275 |
| 2010/0027048 | A1 | * | 2/2010 | Aritomi et al. | 358/1.14 |
| 2010/0141991 | A1 | * | 6/2010 | Yoshida et al. | 358/1.15 |

FOREIGN PATENT DOCUMENTS

| CN | 101047770 A | 10/2007 |
| CN | 101616226 A | 12/2009 |
| JP | 9-163121 A | 6/1997 |
| JP | 2000-244728 A | 9/2000 |
| JP | 2001-251492 A | 9/2001 |
| JP | 2002-010059 A | 1/2002 |
| JP | 2010-062924 A | 3/2010 |

* cited by examiner

*Primary Examiner* — Steven Kau

(74) *Attorney, Agent, or Firm* — Canon USA, Inc. IP Division

(57) ABSTRACT

Image data corresponding to a plurality of documents placed on a document plate is individually output. In this case, if an inclined document is included in the documents, the document is output after being subjected to inclination correction. However, if a document which does not accept the inclination correction is included, documents other than the document are output.

15 Claims, 5 Drawing Sheets

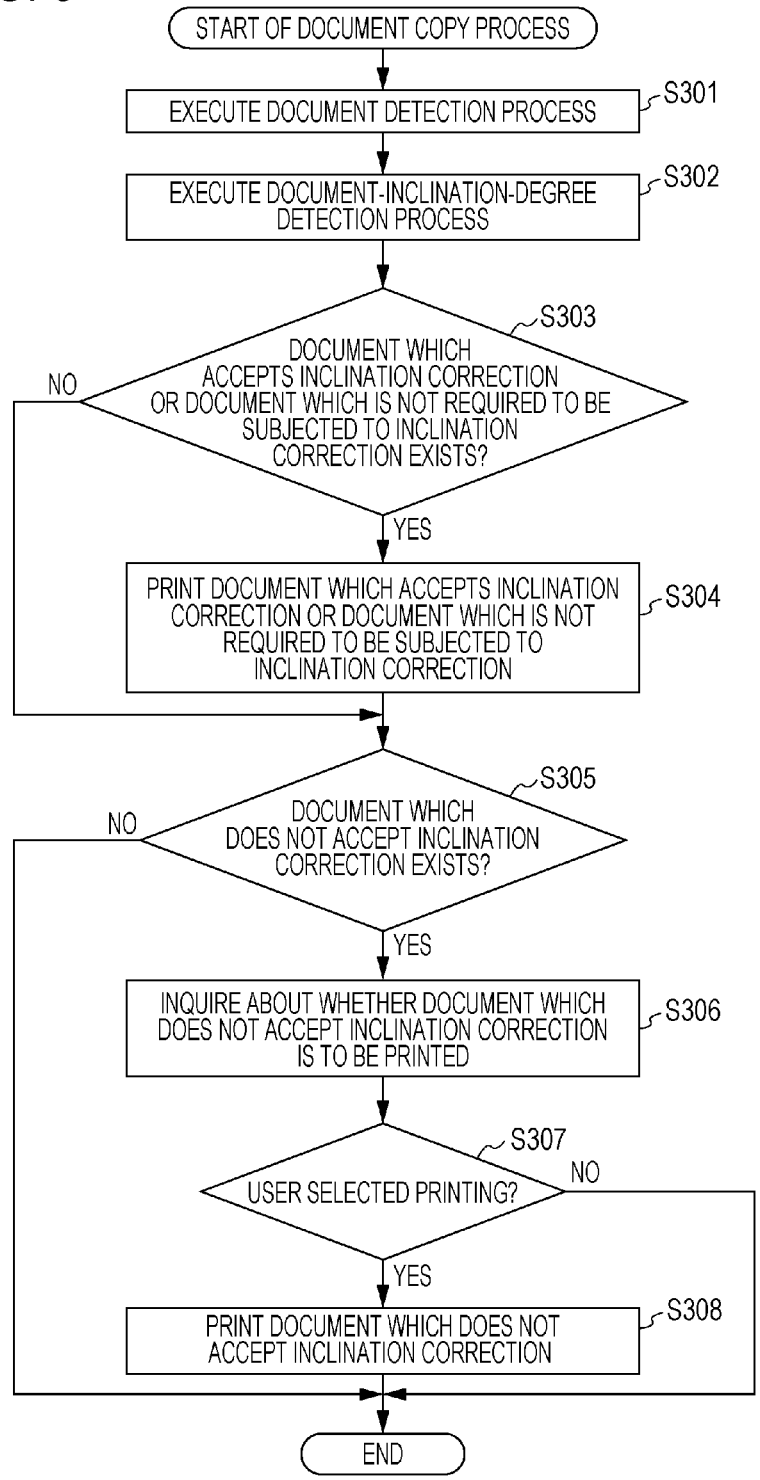

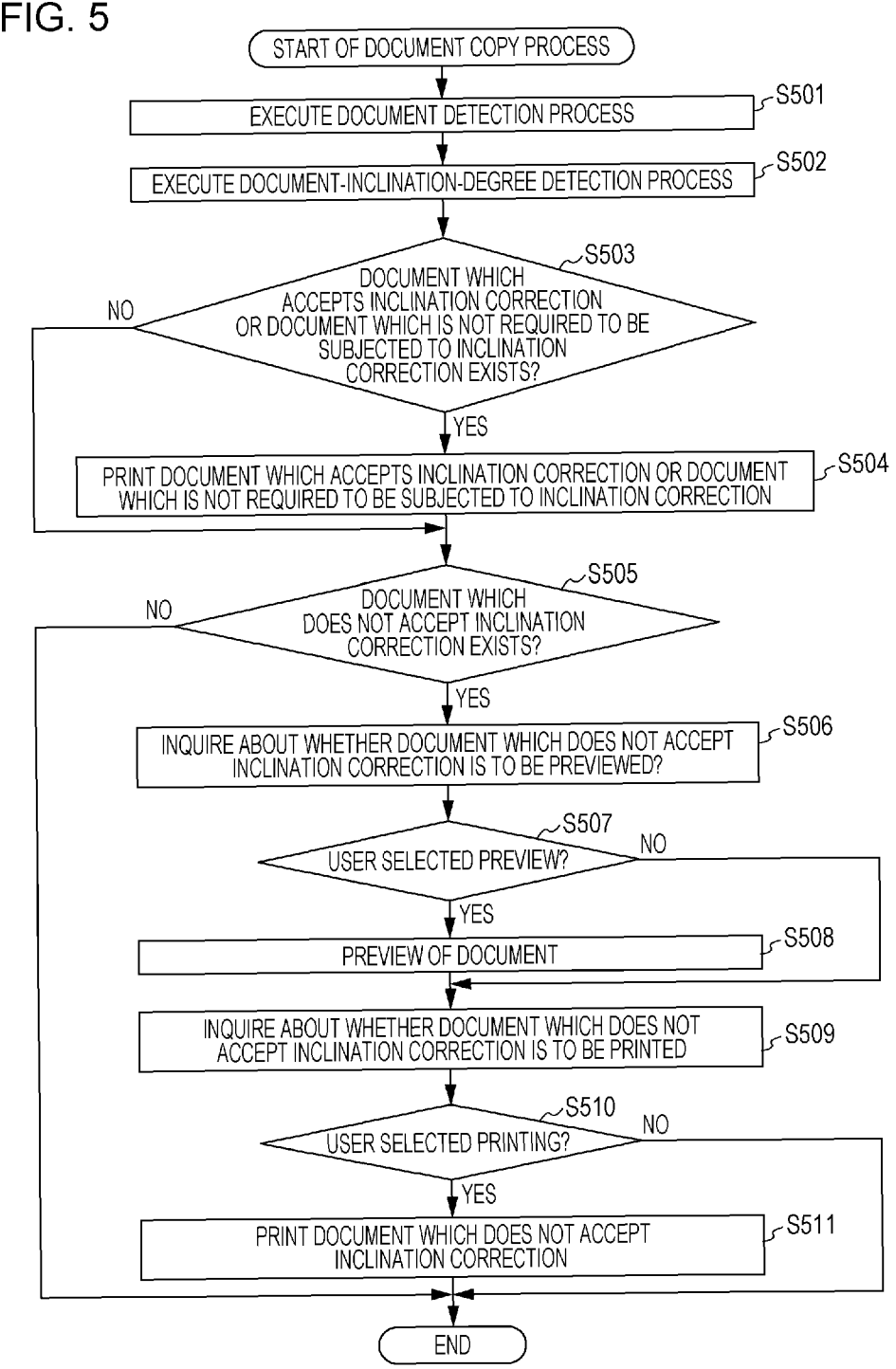

IMAGE PROCESSING APPARATUS CORRESPONDING TO A PLURALITY OF DOCUMENTS ON A DOCUMENT PLATE, METHOD FOR CONTROLLING THE SAME, AND PROGRAM

BACKGROUND OF THE INVENTION

1. Field of the Invention

The present invention relates to an image processing apparatus which processes image data and a method for controlling the same.

2. Description of the Related Art

In general, when images corresponding to a plurality of documents placed on a document plate are read and processed by a reading device, an inclination correction process of correcting inclinations of documents has been performed (refer to Japanese Patent Laid-Open No. 9-163121). Furthermore, in a case where the document inclination correction process is performed, when a document is too inclined to perform correction, an alert is generated so that the document is reset (refer to Japanese Patent Laid-Open No. 2001-251492).

In a case where the inclination correction process is performed on a plurality of documents as disclosed in Japanese Patent Laid-Open No. 9-163121, if an inclination of a document is too large to correct the inclination as described in Japanese Patent Laid-Open No. 2001-251492, an alert is generated so that the document is reset or the process is continued while the correction is not appropriately performed.

However, in the case where the reset of the document is performed as described above, when a document cover of the reading device is opened or closed, the documents may be shifted and one of the documents which was inclined but which at least accepted the inclination correction in the first reading operation may be further inclined so that the inclination correction is not accepted. Furthermore, when the process is to be continued while the correction is not appropriately performed, an unexpected result for a user may be obtained.

SUMMARY OF THE INVENTION

According to an aspect of the present invention, an apparatus including an input unit configured to input image data corresponding to a plurality of documents placed on a document plate, the image data being obtained by reading the documents using a reading device, a determination unit configured to determine whether each of the documents accepts inclination correction, a selection unit configured to select first image data corresponding to first documents, the first documents being documents among the plurality of documents not to accept the inclination correction as an output target, and an output unit configured to output the first image data.

The aspects of the present invention described above and other aspects will become apparent from the following description with reference to the accompanying drawings.

BRIEF DESCRIPTION OF THE DRAWINGS

FIG. 3 is a flowchart illustrating a process according to the embodiment.

FIG. 5 is a flowchart illustrating another process according to the embodiment.

DESCRIPTION OF THE EMBODIMENTS

Hereinafter, an embodiment of the present invention will be described with reference to the accompanying drawings. Note that components and processing procedures of a device of this embodiment are merely examples and the present invention is not limited to them.

Figure 1:
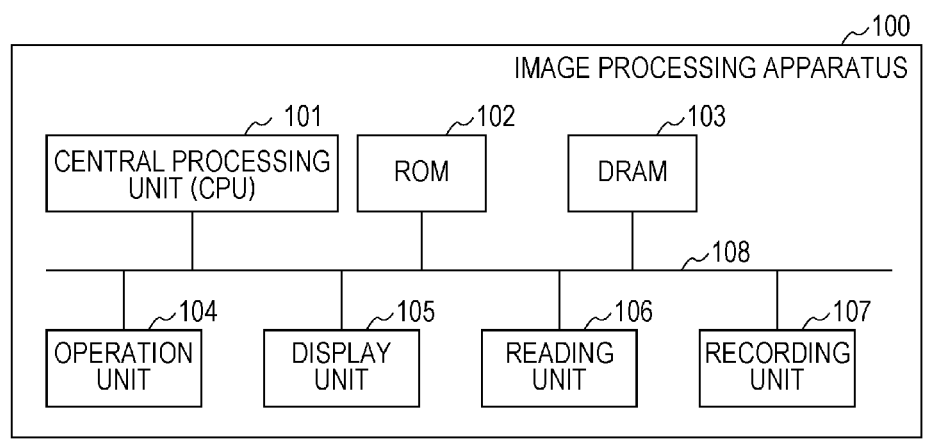
FIG. 1 is a diagram illustrating a configuration of an image processing apparatus according to an embodiment of the present invention.

FIG. 1 is a block diagram illustrating a configuration of an image processing apparatus 100 according to an embodiment of the present invention. In FIG. 1, a central processing unit (CPU) 101 controls operation of the image processing apparatus 100 in accordance with programs stored in a ROM 102. The ROM 102 stores the programs to be executed by the CPU 101, information on settings associated with the operation of the image processing apparatus 100, and the like. A DRAM 103 is used as a work area of the CPU 101 and a temporary storage area which stores image data to be processed. Storage control such as reading and erasing of data from and writing of data to the DRAM 103 is performed by the CPU 101. An operation unit 104 includes various keys operated by a user. A display unit 105 displays information to be notified to the user. A reading unit 106 performs optical scanning on images of the documents and generates image data representing the images of the documents. After the documents are placed on the document plate and an openable-and-closable document cover is closed, the reading unit 106 reads images on the documents in response to an input reading instruction issued by the operation unit 104 so as to generate electric image data representing the images. A recording unit 107 records the images on a recording medium such as a printing sheet using a recording agent such as ink in accordance with the input image data. A system bus 108 is used to perform predetermined data communication among the components.

With this configuration, the image processing apparatus 100 reads the documents placed on the document plate by the reading unit 106 and processes the individual documents. Specifically, the CPU 101 detects the documents from the image data obtained through the reading performed by the reading unit 106, extracts image data corresponding to the individual documents, and processes the image data. Furthermore, the CPU 101 detects degrees of inclinations of the documents and performs correction of inclinations of the documents. The inclination correction is appropriately executable on documents which satisfy a predetermined condition (a degree of an inclination (angle) is 10 degrees or less, for example). Documents which do not satisfy the predetermined condition are reset by the user before being read by the reading unit 106. Note that various methods may be employed as a method for detecting documents, a method for extracting documents, a method for detecting degrees of inclinations, and a method for correcting inclinations.

Figure 2:
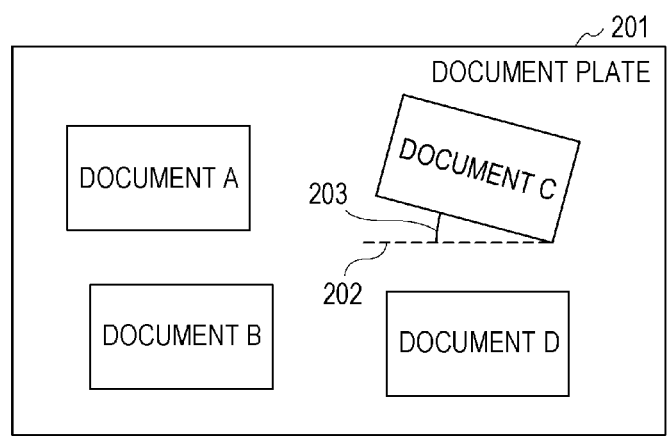
FIG. 2 is a diagram illustrating documents placed on a document plate.

FIG. 2 is a diagram schematically illustrating a plurality of documents placed on a document plate 201. In FIG. 2, the document plate 201 is viewed from above. It is assumed that the user sets documents A and C in positions far from the operation unit 104 and documents B and D near the operation unit 104 as shown in FIG. 2. The document plate 201 is a transparent plate and images of the documents set as shown in FIG. 2 are read by the reading unit 106 from a lower side of the transparent plate. Accordingly, the user sets the documents so that faces of the documents to be read direct downward. In FIG. 2, a reference line 202 extends in a horizontal direction in parallel to sides of the document plate 201 extending in the horizontal direction. An inclination angle 203 represents a degree of an inclination of a document. It is assumed that, when the inclination angle 203 is equal to or larger than a predetermined angle relative to the reference line 202, the CPU 101 is not capable of performing inclination correction. In FIG. 2, it is assumed that the document C is too inclined to accept the inclination correction. Note that the reference line 202 and a line representing the inclination angle 203 are shown for an explanation and do not exist on the document plate 201. Furthermore, the number of detectable documents is not limited to four, and various numbers may be employed.

Next, a flow of a process of reading the images of the document placed on the document plate using the reading unit 106, performing the inclination correction on image data of the documents for individual documents, and individually processing the data will be described. FIG. 3 is a flowchart illustrating the process performed in this case. The flowchart illustrates a flow of a process performed when the CPU 101 loads a program stored in the ROM 102 into the DRAM 103 and executes the program. This flowchart is started when a document copy process of extracting the documents and recording the documents in respective recording media is specified and start of the process is instructed by the operation unit 104. Furthermore, in this case, an operation of outputting documents after correcting inclinations of the documents is specified by the operation unit 104 in advance. Moreover, in detection of documents, the number of documents may be specified by the operation unit 104 in advance or the number of documents may be automatically detected.

First, in step S301, the reading unit 106 reads the images of the documents placed on the document plate so as to detect the documents placed on the document plate. In this case, the reading unit 106 reads a certain range in the document plate, analyzes image data obtained through the reading, and specifies edge portions of the documents so as to detect shapes of the individual documents. Note that a method for detecting the documents is not limited to this, and various methods may be used such as a method for detecting documents in accordance with an output of a photointerrupter disposed on a lower portion of the document plate when the document cover is opened or closed. Here, since the documents are set separately from one another as shown in FIG. 2, the four documents are detected.

Next, in step S302, degrees (angles) of inclinations of the individual documents detected in step S301 are detected. Specifically, rectangular regions are set for individual documents according to the shapes of the documents detected in step S301, and angles defined by low sides of the rectangle regions and one side of the document plate (horizontal reference) which extends in the horizontal direction are detected. Note that, here, any method for detecting an inclination may be employed as long as a determination as to whether the inclination correction process is to be performed can be made and degrees of inclinations are detected to perform the inclination correction process. Furthermore, the degrees of inclinations may be determined by another method instead of the angles defined by the lower sides of the rectangular regions of the documents and the lower sides of the document plate. Furthermore, in this embodiment, although the degrees of inclinations and sizes of the documents A, B, and D are specified since the documents are set as shown in FIG. 2, as for the document C, it is only determined that the degree of an inclination of the document C is larger than the predetermined degree. However, a rectangular region is set for the document C in accordance with the predetermined condition. The image data of the documents read by the reading unit 106 is distinguished for individual documents and stored in the DRAM 103.

In step S303, in accordance with a result of the detection performed in step S302, it is determined whether a document which accepts the inclination correction process or a document which is not required to be subjected to the inclination correction process (that is, a document having an inclination degree of zero or approximately zero) is included in the documents detected in step S301. When the determination is affirmative, the process proceeds to step S304 whereas when the determination is negative, the process proceeds to step S305.

In step S304, the inclination correction process is performed on the document which is determined to accept to the correction process or the inclination correction process is not performed on the document which is determined not to be subjected to the inclination correction process, and thereafter, the document is recorded (printed) in the recording unit 107. In this case, image data of the documents is individually recorded in recording media. Note that, in a case where copy at the same magnification is specified by the operation unit 104, the images are recorded in recording media having sizes corresponding to sizes of the documents. If the sizes of the recording media are specified or magnification is specified, a process of changing magnification is performed on the image data before the images are recorded.

In step S305, it is determined whether an image which does not accept the inclination correction process, that is, an image of a document which has not been printed in step S304 exists. When the determination is affirmative, the process proceeds to step S306 whereas when the determination is negative, the process is terminated since the instructed copy process is terminated. Note that, when a document in which an angle relative to the horizontal reference is not detected in step S302 exists, the document corresponds to a target of the affirmative determination performed in step S305.

Figure 4A:
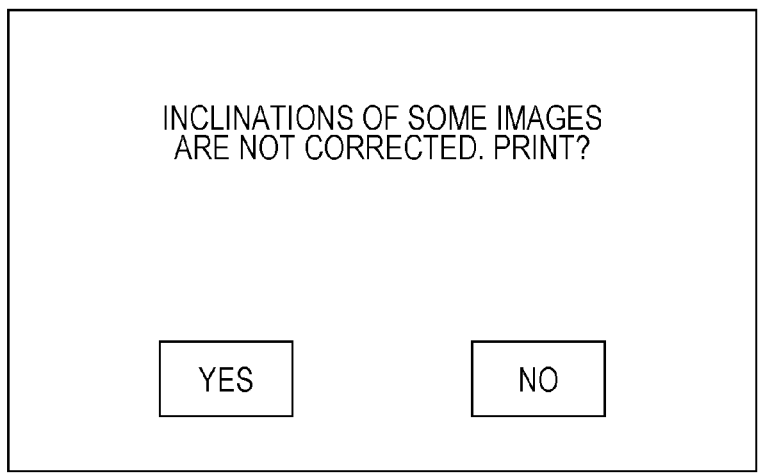
FIGS. 4A and 4B are diagrams illustrating a display screen of a display unit.

In step S306, an inquiry about whether an image corresponding to the document which does not accept the inclination correction process is to be printed is displayed in the display unit 105 as shown in FIG. 4A. When the document which does not accept the inclination correction process is included in the read documents, the user checks content and the number of images corresponding to documents printed in step S304 so that the image of the document which does not accept the inclination correction process is determined. Accordingly, the user may specify the document without opening the document cover.

Thereafter, when the user selects printing through the operation unit 104 in step S307 in response to the inquiry issued in step S306, the process proceeds to step S308 whereas when the user did not select printing in step S307, the process is terminated here.

In step S308, the image corresponding to the document which does not accept the inclination correction process is stored in the recording medium using the recording unit 107. After all images of documents which do not accept the inclination correction process are recorded, this flow is terminated. Note that, here, the image of the document which is determined by the CPU 101 not to accept the inclination correction process is recorded in accordance with the determination made by the user so that even an image of a document which invites a false detection due to content of the image may also be recorded. Specifically, when a document including a white background and an image diagonally inclined is read by the reading unit 106, it is likely that the CPU 101 determines that the document is inclined to the degree larger than the predetermined inclination degree. When the user has recognized such a document or when the user wishes to print a document which is intentionally set in an inclination manner, the document is printed without change by selecting printing in step S307.

Figure 4B:
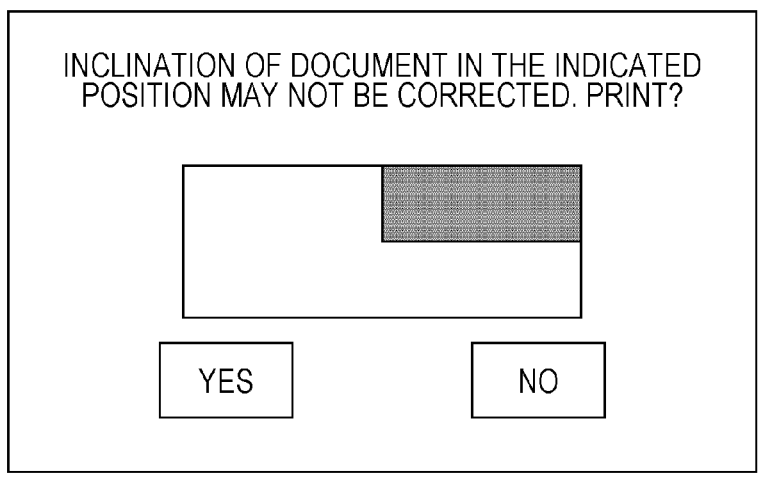

Note that content of the inquiry for display in the display unit 105 issued in step S306 is not limited to that shown in FIG. 4A. For example, a screen shown in FIG. 4B may be displayed so that the user can easily specify the document which does not accept the inclination correction process. The screen displayed in FIG. 4B represents that one of the documents which is set in an upper right portion (the document C shown in FIG. 2) in the document plate does not accept the inclination correction process. Here, a display mode is changed so that, since the four documents are read, a region in the upper right portion in the document plate which is divided into four regions is distinguishable. When two documents are read, the document plate which is divided into two regions is displayed in the screen.

In the example described above, when a target document which does not accept the inclination correction process is included in the documents, the user specifies the target document with reference to images of documents which have been appropriately printed or a position of the target document placed on the document plate. In an example below, an image which does not accept the inclination correction process among documents read by the reading unit 106 is displayed in the display unit 105 so that the user confirms the document which does not accept the inclination correction process.

FIG. 5 is a flowchart illustrating a process performed in this case. As with the case of FIG. 3, this flowchart illustrates a flow of a process performed when the CPU 101 loads a program stored in the ROM 102 into the DRAM 103 and executes the program.

Operations in step S501 to step S505 are the same as those in step S301 to step S305, and therefore, descriptions thereof are omitted. In step S506, an inquiry about whether a preview of an image corresponding to a document which does not accept the inclination correction process is performed is displayed in the display unit 105. Then, in step S507, it is determined whether the user selected a preview using the operation unit 104. When the determination is affirmative, the process proceeds to step S508 whereas when the determination is negative, the process proceeds to step S509.

In step S508, among documents read by the reading unit 106 in step S501, a document which is determined not to accept the inclination correction process is displayed in the display unit 105. In this case, data of the read image is subjected to a magnification process or the like in accordance with a size of the display unit 105, a resolution, or the like. The preview is performed such that a position of a rectangular region set when an image of the document is read by the reading unit 106 is distinguishably displayed. Furthermore, when a plurality of documents do not accept the inclination correction process, the documents which are preview targets are successively switched from one to another in response to an instruction issued using the operation unit 104.

Thereafter, the preview of the image of the document which does not accept the inclination correction process is terminated, an inquiry about whether the image of the document which does not accept the inclination correction process is to be printed is displayed in the display unit 105 in step S509 as shown in FIG. 4A. Operations in step S509 to step S511 are the same as those in step S306 to step S308, and descriptions thereof are omitted.

According to the process shown in FIG. 5, as described above, the user may determine whether the document which does not accept the inclination correction process is to be printed after the image of the document which does not accept the inclination correction process is previewed. Accordingly, the user may determine whether printing is performed after a print state of the image of the document which does not accept the inclination correction process is confirmed.

Note that, in the example shown in FIG. 5, after the preview is performed in step S508, the inquiry about whether the document which does not accept the inclination correction is to be printed is issued in step S509. In accordance with a response for the inquiry, it is determined whether the document which does not accept the inclination correction process is to be printed. However, when a plurality of documents do not accept the inclination correction process, the user may wish to determine whether printing is to be performed for each document. Accordingly, when a plurality of documents do not accept the inclination correction process, every time a document is previewed, an inquiry about whether printing is to be performed is issued in step S509 and a document to be printed may be determined in accordance with a user's response to the inquiry. In this way, among the documents which do not accept the inclination correction process, documents specified by the user may be selectively printed. Furthermore, a document which accepts the inclination correction process or a document which is not required to be subjected to the inclination correction process may be previewed.

Furthermore, when the document which does not accept the inclination correction process is included, the process may be terminated while no images of the documents are printed. For example, the process may be terminated when the determination is negative in step S507.

In the examples described above, in a case where a document which accepts the inclination correction process or a document which is not required to be subjected to the inclination correction process is included, even when the document which does not accept the inclination correction process is included, printing is performed (in step S304 or step S504). However, when at least one of the documents does not accept the inclination correction process (or it is possible that at least one of the document does not accept the inclination correction process), some users wish not to execute printing on any of the documents. In an example described below, when a document which does not accept the inclination correction process is included, printing is performed after user's willingness is confirmed.

Figure 6:
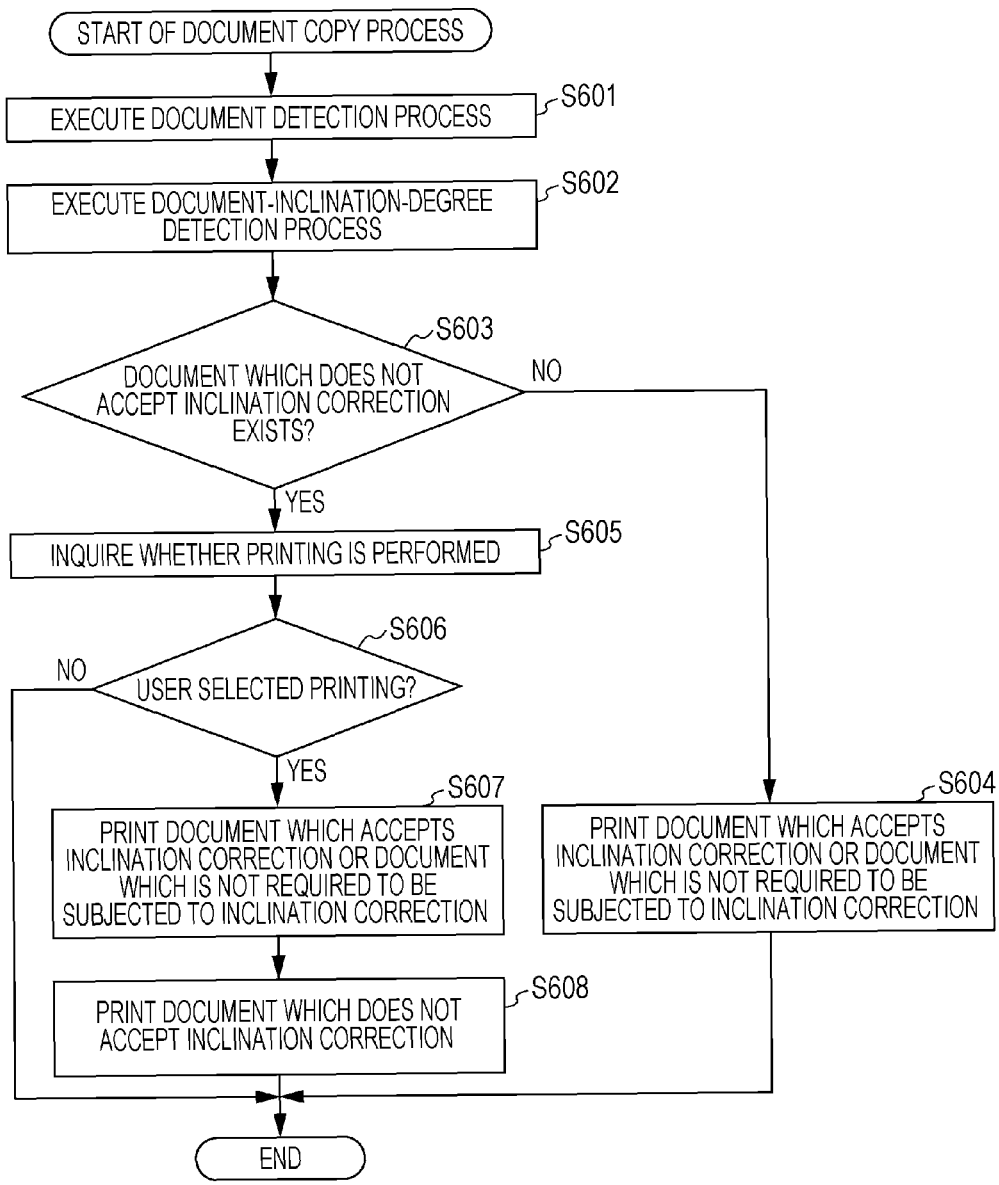
FIG. 6 is a flowchart illustrating a further process according to the embodiment.

FIG. 6 is a flowchart illustrating a process performed in this case. As with the case of FIG. 3, this flowchart illustrates a flow of a process performed when the CPU 101 loads a program stored in the ROM 102 into the DRAM 103 and executes the program.

Operations in step S601 to step S603 are the same as those in step S301 to step S303, and therefore, descriptions thereof are omitted. When it is determined that a document which does not accept the inclination correction process is included in step S603, the process proceeds to step S604 and otherwise the process proceeds to step S604.

In step S604, the inclination correction process is performed on image data corresponding to a document which accepts the inclination correction process or the inclination correction process is not performed on image data corresponding to a document which is not required to be subjected to the inclination correction process, and the document is recorded in the recording unit 107. Here, image data of all the documents is recorded by the recording unit 107, and after the recording of all the documents performed by the recording unit 107 is terminated, the processing flow is terminated here.

In step S605, an inquiry about whether printing is to be performed is displayed in the display unit 105 as shown in FIG. 4A or FIG. 4B. Thereafter, when it is determined that the user selected printing through the operation unit 104 in response to the inquiry in step S606, the process proceeds to step S607 whereas when it is determined that the user did not select printing, the process is terminated here.

In step S607, the inclination correction process is performed on image data corresponding to the document which accepts the inclination correction process or the inclination correction process is not performed on image data corresponding to the document which is not required to be subjected to the inclination correction process, and the document is recorded in the recording unit 107. In step S608, an image corresponding to the document which does not accept the inclination correction process is stored in a recording medium using the recording unit 107. Note that the operations in step S607 and step S608 may be performed in a reverse order. When the operation in step S607 is performed before the operation in step S608, a notification representing that the document which has been subjected to the inclination correction process or the document which is not required to be subjected to the inclination correction process is being printed is displayed in the display unit 105, and thereafter, a notification representing that the document which does not accept the inclination correction is to be printed is displayed so that the user may stop the printing. Specifically, even in a case where the user mistakenly selects the printing in step S606, when viewing a document printed in step S607, the user determines that printing performed thereafter (printing performed in step S608) is not required and the unnecessary printing may be stopped using the operation unit 104.

As described above, according to the process shown in FIG. 6, when the document which does not accept the inclination correction is included, the determination whether printing is to be performed may be made before the printing. Accordingly, unnecessary printing is prevented from being unwillingly performed.

Note that, as with the process shown in FIG. 5, the preview may be performed also in the process shown in FIG. 6. In this case, between the operations in step S603 and step S605, the determination as to whether the printing is to be performed may be made by performing the preview process described with reference to FIG. 5.

As described above, according to this embodiment, in a case where some of a plurality of documents are subjected to the inclination correction process and the documents are separately processed, even when a document which does not accept the inclination correction process is included, operability is improved. According to the examples described with reference to FIGS. 3 and 5, an image of a document which does not accept the inclination correction process is excepted and images of documents which have been appropriately read are printed first. Then, the document which does not accept the inclination correction process is reset so that the document is read and printed. Accordingly, delay of the operation which occurs in a case where a document which had been appropriately read is inclined since the documents are reset until all the documents are appropriately set may be prevented. Furthermore, according to the example described with reference to FIG. 6, since the printing is performed when all the documents are appropriately read, undesired printing is prevented from being performed. Note that, although the examples of the processes performed when a document which does not accept the inclination correction process is included have been described hereinabove, the user selects one of the processes which is to be performed when it is determined that the document which does not accept the inclination correction is included in advance using the operation unit 104 and the process is performed in accordance with the selection.

Furthermore, in the foregoing description, a multifunction peripheral including the reading unit 106 and the recording unit 107 is taken as an example. However, the process in this embodiment may be performed in any apparatus other than the multifunction peripheral having such a configuration. A reading device (scanner) and a recording device (printer) may be connected to a general personal computer (PC), programs (software) used to execute the process in this embodiment may be installed in the PC, and the scanner and the printer may be simultaneously operated. Furthermore, the process of this embodiment may be executed by a scanner which is connectable to an external printer (which performs printing in response to an instruction supplied from the scanner). Furthermore, the process of this embodiment may be executed by a printer which is connectable to an external scanner (which performs reading under control of the printer).

Furthermore, in the foregoing description, the images of the documents placed on the document plate are read by the reading device. However, the present invention is not limited to this, and a document may be sandwiched between transparent films and may be read by a reading device while the sandwiched document is conveyed by an automatic document-conveying device.

Furthermore, in the foregoing description, the reading device which reads the images on the document plate and which serves as an input source of the images of the documents and the recording device which prints the images and which serves as an output destination of image data representing the images of the documents are taken as examples. However, the present invention is not limited to these. As an input source of images of documents, a digital still camera, image-processing application software installed in a PC, or the like may be employed. In this case, image data is input from the input source in a unit of page and the reading performed by the reading unit 106 is replaced by input of image data representing the images of the document. Specifically, each page corresponds to each document. When a concept of "page" is not suitable for the input source, "a unit of file" is employed instead of "a unit of page". That is, one file corresponds to one document. Furthermore, as an output destination, transmission to an external device or storage in an external storage device may be employed instead of the recording device. In this case, when image data is output, image data corresponding to a plurality of pages is distinguished from one another and output in a unit of page. For example, the output image data is displayed in a unit of page in application software operating in an external apparatus. In this case, image data corresponding to a document which accepts the inclination correction process is displayed in a corrected state. Furthermore, the process of distinguishing and outputting the image data corresponding to a plurality of pages includes transmission and storage of the image data corresponding to the plurality of pages as different files. As a method for transmission, electronic-mail transmission in which the image data corresponding to the plurality of pages are formed as different image files serving as attached files may be employed. Furthermore, examples of the method for transmission include FTP transmission, SMB transmission, and WebDAV transmission in addition to the electronic-mail transmission. Moreover, when the image processing apparatus is connected to an external apparatus through a local I/F such as a USB I/F, the image data corresponding to the plurality of pages is transmitted to the external apparatus in accordance with a USB protocol. Examples of the external storage device include a portable memory medium such as a detachable memory card or a USB memory and a storage device which is externally connected through a cable.

Note that, in a case where a digital still camera serves as an input source of documents, an image obtained when the camera is inclined at a time of shooting is subjected to the inclination correction process as described above. Furthermore, when application software serves as an input source of documents, an inclined image is obtained by the application software, and thereafter, is subjected to the inclination correction process as described above.

Moreover, the foregoing embodiment is also realized by executing the following processes. Specifically, software (a program) which realizes functions of the foregoing embodiment is supplied to the system or an apparatus through a network or various storage media, and a computer (or CPU or MPU) of the system or the apparatus reads and executes the program. Furthermore, the program may be executed by a single computer or by a plurality of computers in conjunction with one another. Moreover, it is not necessary to realize all the processes described above by the software, and part of or all the processes may be realized by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-285153 filed Dec. 21, 2010, which is hereby incorporated by reference herein in its entirety.

What is claimed is:

1. An apparatus comprising:
an input unit configured to input image data corresponding to a first original and a second original which are concurrently placed on an original plate, the image data being obtained by reading the first original and the second original using a reading device;
a specifying unit configured to specify a first inclination of the first original with respect to a reference and a second inclination of the second original with respect to the reference, based on the input image data input by the input unit;
an output unit configured to output a second image corresponding to the second original based on the input image data and not to output a first image corresponding to the first original in a case where the first inclination specified by the specifying unit is larger than a predetermined inclination, and the second inclination specified by the specifying unit is not larger than the predetermined inclination; and
an inquiry unit configured to inquire about whether the first image is to be output,
wherein, even if the first inclination is larger than the predetermined inclination, the output unit outputs the first image in a case where a response to the inquiry indicates the output of the first image.

2. The apparatus according to claim 1,
wherein the inquiry unit shows a position in which the first original is placed on the original plate in a case where issuing the inquiry.

3. The apparatus according to claim 1, further comprising:
a preview unit configured to preview the first image, in a case where the first inclination is larger than the predetermined inclination,
wherein the output unit outputs the previewed first image in accordance with an output instruction issued in response to the inquiry.

4. The apparatus according to claim 1,
wherein the inquiry unit executes the inquiry after the output of the second image by the output unit.

5. A method comprising:
inputting image data corresponding to a first original and a second original which are concurrently placed on an original plate, the image data being obtained by reading the first original and the second original using a reading device;
specifying a first inclination of the first original with respect to a reference and a second inclination of the second original with respect to the reference, based on the input image data;
outputting a second image corresponding to the second original based on the input image data and not outputting a first image corresponding to the first original in a case where the first specified inclination is larger than a predetermined inclination, and the second specified inclination is not larger than the predetermined inclination; and
inquiring about whether the first image is to be output,
wherein, even if the first inclination is larger than the predetermined inclination, the first image is output in a case where a response to the inquiry indicates the output of the first image.

6. A non-transitory computer-readable storage medium which stores a computer-executable program for controlling a method, the method comprising:
inputting image data corresponding to a first original and a second original which are concurrently placed on an original plate, the image data being obtained by reading the first original and the second original using a reading device;
specifying a first inclination of the first original with respect to a reference and a second inclination of the second original with respect to the reference, based on the input image data;
outputting a second image corresponding to the second original based on the input image data and not outputting a first image corresponding to the first original in a case where the first specified inclination is larger than a predetermined inclination, and the second specified inclination is not larger than the predetermined inclination; and
inquiring about whether the first image is to be output,
wherein, even if the first inclination is larger than the predetermined inclination, the first image is output in a case where a response to the inquiry indicates the output of the first image.

7. The apparatus according to claim 1, further comprising a correction unit configured to correct an inclination of an image corresponding to an original,
wherein in a case where the second inclination is not larger than the predetermined inclination, the output unit outputs the second image of which the second inclination is corrected by the correction unit.

8. The apparatus according to claim 7, further comprising a determination unit configured to determine whether each of the first original and the second original accepts inclination correction by the correction unit, based on whether or not each of the first inclination and the second inclination is larger than the predetermined inclination, and wherein the output unit outputs the second image and does not output the first image, in a case where the determination unit determines that the second original accepts inclination correction and the first original does not accept inclination correction.

9. The apparatus according to claim 8, wherein in a case where an inclination corresponding to the second original is approximately zero, the determination unit determines that the second original does not accept inclination correction and the output unit outputs the second image of which the second inclination is not corrected by the correction unit.

10. The apparatus according to claim 1, wherein in a case where both of the first inclination and the second inclination are not larger than the predetermined inclination, the output unit outputs each of the first image and the second image distinctively.

11. The apparatus according to claim 1, wherein the output unit causes a printing apparatus to print the second image.

12. The apparatus according to claim 11, wherein in a case where both of the first inclination and the second inclination are not larger than the predetermined inclination, the output unit causes the printing apparatus to print each of the first image and the second image on different sheets.

13. The apparatus according to claim 1, further comprising the reading device.

14. The apparatus according to claim 7, wherein in a case where the first inclination is larger than the predetermined inclination, the correction unit does not correct the first inclination and the output unit does not output the first image.

15. The apparatus according to claim 7, wherein in a case where the first inclination is larger than the predetermined inclination and a response to the inquiry indicates the output of the first image, the correction unit does not correct the first inclination and the output unit outputs the first image.

* * * * *